(12) United States Patent
Cook et al.

(10) Patent No.: US 6,467,439 B1
(45) Date of Patent: Oct. 22, 2002

(54) STEAM GENERATOR TUBE SUPPORT GRID ARRAY

(75) Inventors: John P. Cook, Harrison; William J. Heilker, Hixson, both of TN (US); Daniel A. Peck, South Windsor, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/547,765

(22) Filed: Apr. 12, 2000

Related U.S. Application Data

(60) Provisional application No. 60/139,727, filed on Jun. 18, 1999, and provisional application No. 60/140,755, filed on Jun. 25, 1999.

(51) Int. Cl.[7] ................................................ F22B 37/24
(52) U.S. Cl. ........................................ 122/510; 376/462
(58) Field of Search ................................. 122/510, 511; 376/405, 462; 248/49, 68.1; 211/60.1

(56) References Cited

U.S. PATENT DOCUMENTS

| | | | | |
|---|---|---|---|---|
| 4,124,444 A | * | 11/1978 | Jabsen | 176/78 |
| 4,567,015 A | * | 1/1986 | Bosshard | 376/462 |
| 4,665,866 A | * | 5/1987 | Wepfer | 122/510 |
| 5,263,072 A | * | 11/1993 | Canat et al. | 376/439 |

* cited by examiner

*Primary Examiner*—Gregory Wilson

(57) ABSTRACT

An array grid includes a plurality of interlocking elongate strips. The strips are structured and configured to provide sufficient lateral support for steam generator tubing while minimizing the risk of attack by stress corrosion cracking to the steam generator tubes.

57 Claims, 19 Drawing Sheets

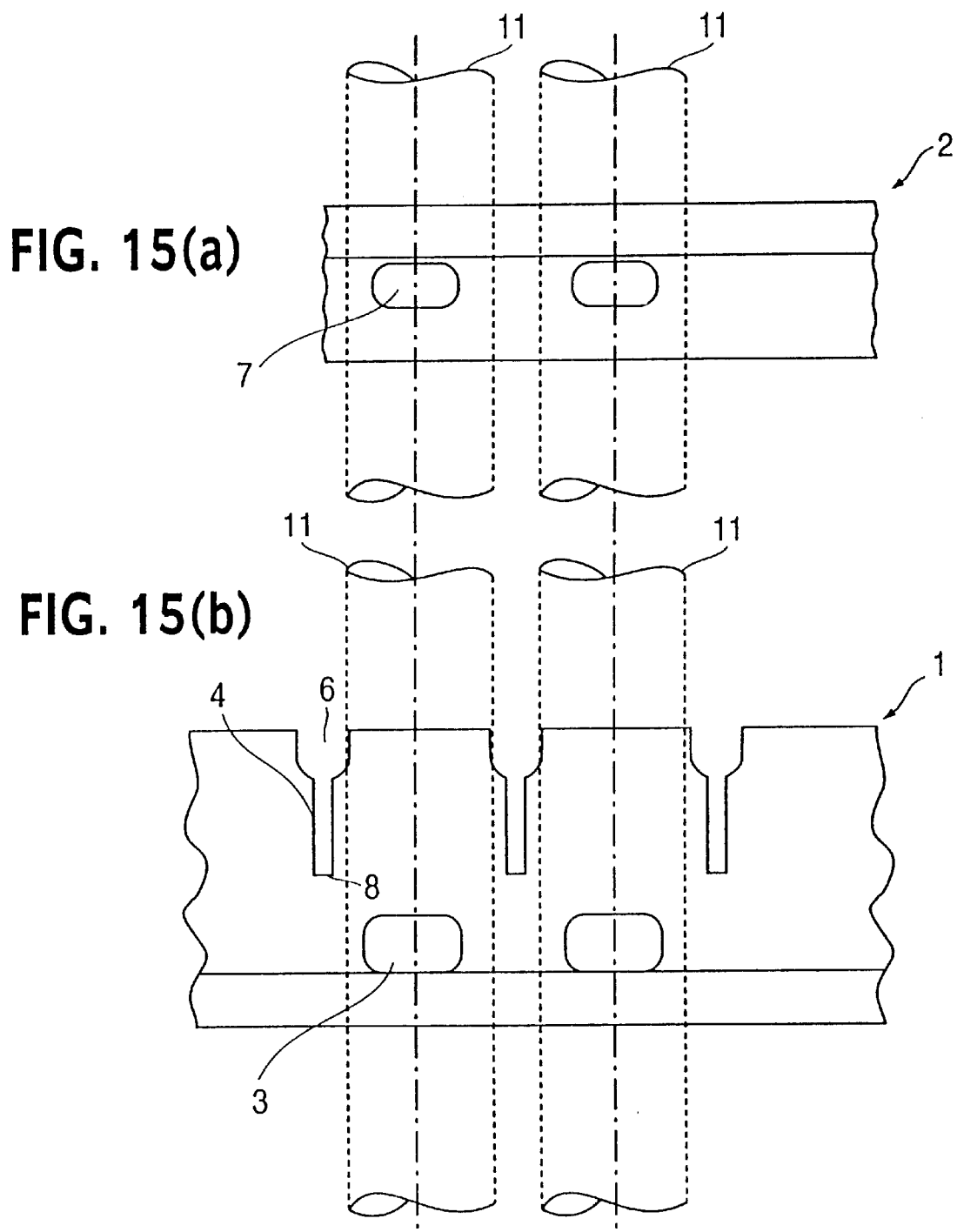

STEAM GENERATOR TUBE SUPPORT GRID ARRAY

CROSS REFERENCE TO RELATED APPLICATIONS

This application is related to and claims the benefit of U.S. Provisional Application No. 60/139,727 filed Jun. 18, 1999 and U.S. Provisional Application No. 60/140,755 filed Jun. 25, 1999.

BACKGROUND OF THE INVENTION

1. Field of the Invention

The present invention relates generally to a support structure for tubing within a steam generator. More particularly, the invention relates to an array grid that provides lateral support for steam generator tubing while minimizing the risk of attack by stress corrosion cracking to the steam generator tubes.

2. Description of Related Art

Steam generators are used in nuclear power plants to transfer the fission-generated heat from the plant's primary coolant system to the plant's secondary steam system. Typically, the primary coolant flows through tubes within the steam generator, while secondary water surrounds the outer portion of the tubes. To ensure sufficient heat transfer from the primary coolant to the secondary water, the steam generator tubes must be sufficiently thin, be constructed of a material having a relatively high heat transfer coefficient, and have sufficient heat transfer area. Additionally, the material of construction must be able to withstand the high level of differential pressure developed across the tube from the primary plant side to the secondary steam plant side. Meeting these design requirements requires sufficiently long runs of tubing within the steam generator. Thus, there is a need to provide lateral support for the tubing at various points along its traversal in and through the steam generator.

Lateral support for steam generator tubing is conventionally provided by a so-called "eggcrate" grid array. A conventional grid array consists of a plurality of spaced apart interlocking bars or strips. The steam generator tubes extend through the spacing between the strips and physically contact side portions of the strips.

One problem long associated with nuclear steam generators has been the insidious attacking of the tubes by various corrosion phenomena, including wastage, pitting, general intergranular attack, and of course, stress corrosion cracking. Stress corrosion cracking is a complex phenomenon, the mechanism for which is not fully understood. Nonetheless, it is generally believed that it involves a local galvanic attack or a reduction in surface energy by chemisorption, or a combination of both. Additionally, it is believed that there are environmental effects associated with stress corrosion cracking, the two most important of which are the tensile stress level and the corrosion media's chemistry.

Steam generator tubes are under constant tensile stress during operation, since the primary system pressure within the tubes is significantly higher than the steam plant pressure surrounding the tubes. Moreover, the secondary plant water within the steam generator is usually maintained at a relatively high pH (>10.0) to alleviate other types of corrosive attack. Yet, because of the areas of contact between the steam generator tubes and the conventional eggcrate grid array, accumulation of particulate matter (colloquially referred to in the art as "sludge") can occur in these areas of contact. When fluid within the steam generator is boiled, in order to produce steam, a portion of the non-volatile chemicals are drawn into the accumulated sludge. As a result, the accumulated sludge concentrates chemicals in the area, increasing the localized pH, and thereby enhancing the likelihood of stress corrosion cracking. Once cracking begins, if it reaches a certain "critical length," it can result in a "fish mouth" rupture of the tube.

Thus, there is a need to provide a grid array that laterally supports tubes in a steam generator, while simultaneously minimizing sludge accumulation at the contact points between the grid array and the tubes.

SUMMARY OF THE INVENTION

It is therefore a principal object of the present invention to provide a steam generator tube support grid array that provides sufficient lateral support for the tubes, while at the same time reduces the likelihood of attack to the tubes by stress corrosion cracking.

In one aspect of the present invention a support structure for tubes within a steam generator comprises a plurality of first elongate strips including a plurality of first slots, and a plurality of second elongate strips. The plurality of first slots each have an open end positioned at a top end of the first elongate strips and a closed end positioned proximate a center portion of the first elongate strips. A width of the closed end of the first slots being greater than a width of the open end thereof. The plurality of second elongate strips are each received into one of the plurality of first slots.

In another aspect of the present invention, a support grid for tubes within a steam generator comprises a plurality of first and second elongate strips. The plurality of first elongate strips each have a cross section including a first protuberant portion, and each include a plurality of first slots arranged along a length thereof. The plurality of second elongate strips have a cross section including a second protuberant portion, and each of the second elongate strips is received into one of the plurality of first slots.

In still another aspect of the present invention, a lateral support grid array for steam generator tubes comprises a plurality of first and second elongate strips. The first elongate strips include a plurality of first slots each having an open end positioned at a top portion of the first elongate strips and a closed end positioned proximate a center portion of the first elongate strips. A portion of the slots, intermediate the open end and the closed end, has a width greater than a width of the open end and the closed end thereof. Each of the plurality of second elongate strips is received into one of the plurality of first slots.

In yet a further aspect of the present invention, a tube support grid for providing lateral support for tubes within a steam generator comprises a plurality of first, second, third, and fourth elongate strips. The plurality of first elongate strips each have a cross section including at least one protuberant portion, and each include a plurality of first and second slots arranged in alternating fashion along a bottom portion thereof. The first elongate strips extend in a first direction in the support grid array. The plurality of second elongate strips each have a cross section including at least one protuberant portion, and each include a plurality of third and fourth slots arranged in alternating fashion along a top and bottom portion thereof, respectively. Each of the third slots is interlocked with one of the first slots, whereby each of the second elongate strips extend in a second direction, different from the first direction, in the support grid array. The plurality of third elongate strips each have a cross section including at least one protuberant portion, and each include a plurality of fifth and sixth slots arranged in alternating fashion along a top portion thereof. Each of the fifth slots is interlocked with one of the second slots, whereby each of the third elongate strips extend in the second direction, parallel to the second elongate strips. The plurality of fourth elongate strips each have a cross section including at least one protuberant portion, and each include a plurality of seventh and eighth slots arranged in alternating fashion along a top and bottom portion thereof, respectively. Each of the seventh slots is interlocked with one of the fourth slots and each of the eighth slots is interlocked with one of the sixth slots, whereby each of the fourth elongate strips extend in the first direction, parallel to the first elongate strips.

In yet still another aspect of the present invention, a tube support grid for tubes within a steam generator comprises a plurality of first and second elongate strips. The first elongate strips have a cross section including a first protuberant portion positioned such that the first elongate strips have a substantially T-shaped cross section. The second elongate strips have a cross section including a second protuberant portion positioned such that the second elongate strips have a substantially T-shaped cross section. A plurality of slots are arranged along a length of the first elongate strips. Each of the first slots includes an open portion and a closed portion, the open portion having a width dimensioned so as to receive the second protuberant portions. Each of the second elongate strips is received into one of the plurality of slots.

BRIEF DESCRIPTION OF THE DRAWINGS

In the following detailed description, reference will be made to the attached drawings in which:

FIGS. 15(a) and 15(b) depict front views of first and second elongate strips, respectively, according to still a further embodiment of the present invention.

DETAILED DESCRIPTION OF THE PREFERRED EMBODIMENTS

Figure 1:
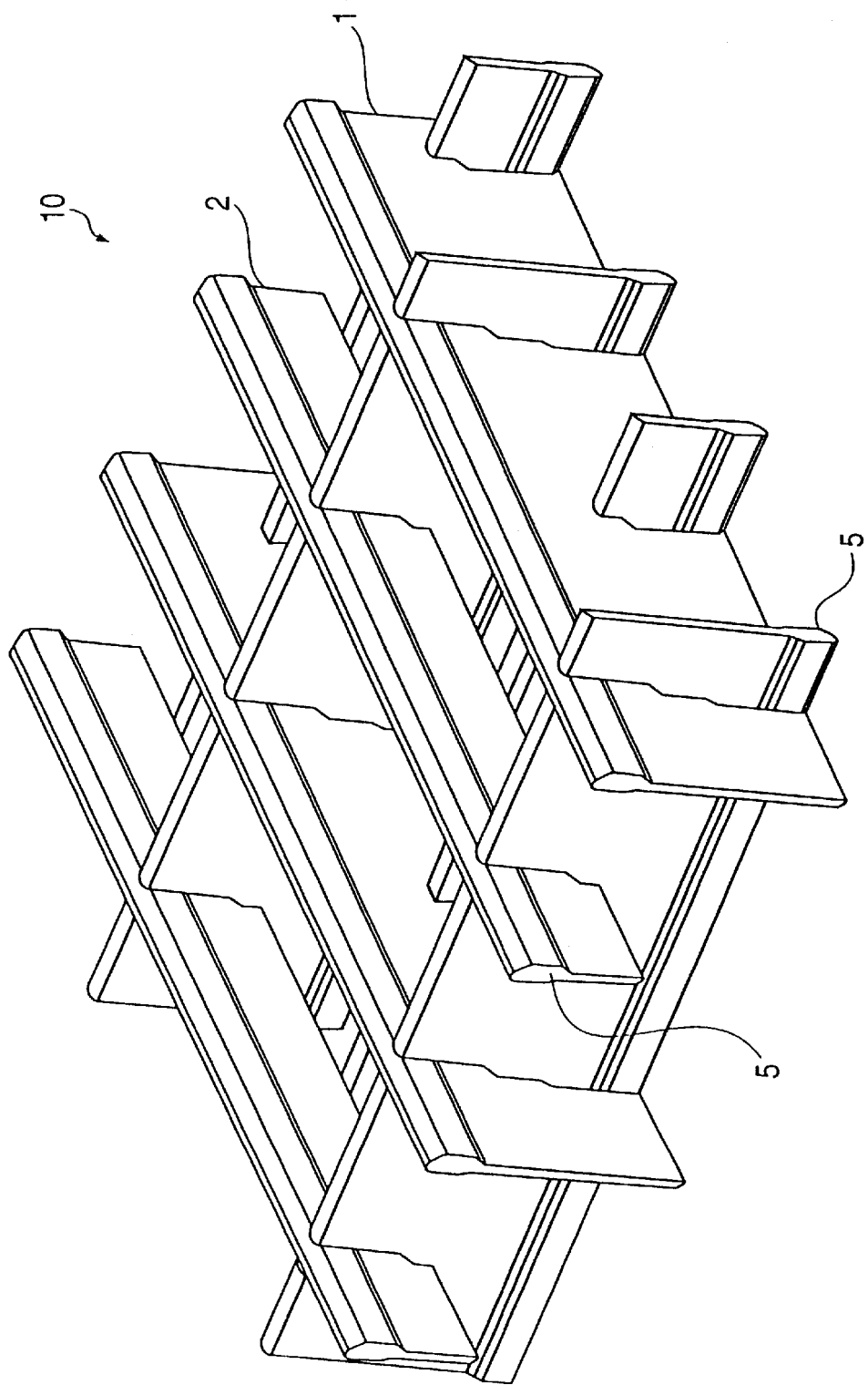
FIG. 1 is a partial perspective view according to the preferred embodiment of the present invention.
Figure 2:
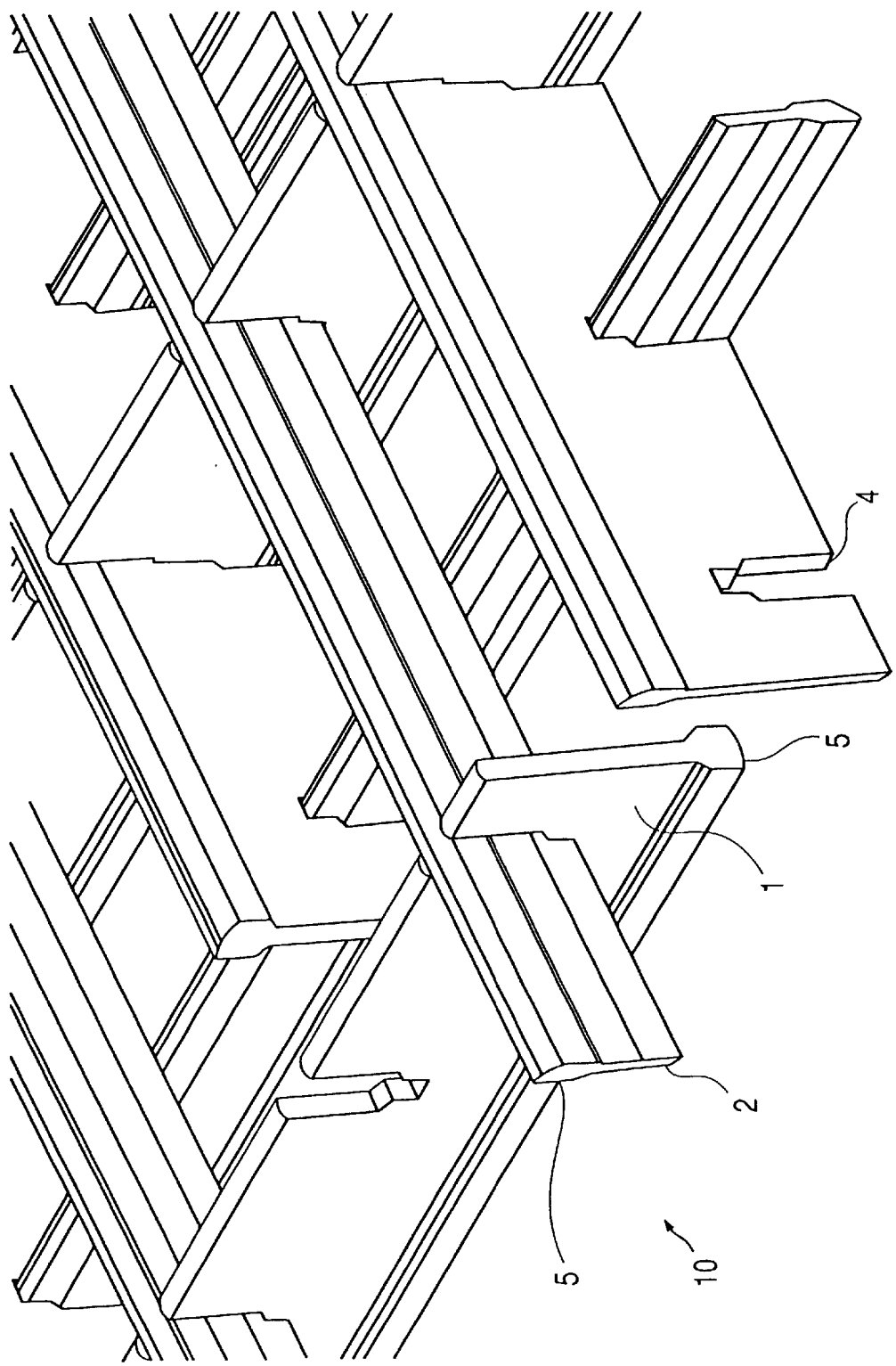
FIG. 2 is an enlarged partial perspective view according to the preferred embodiment of the present invention.
Figure 3:
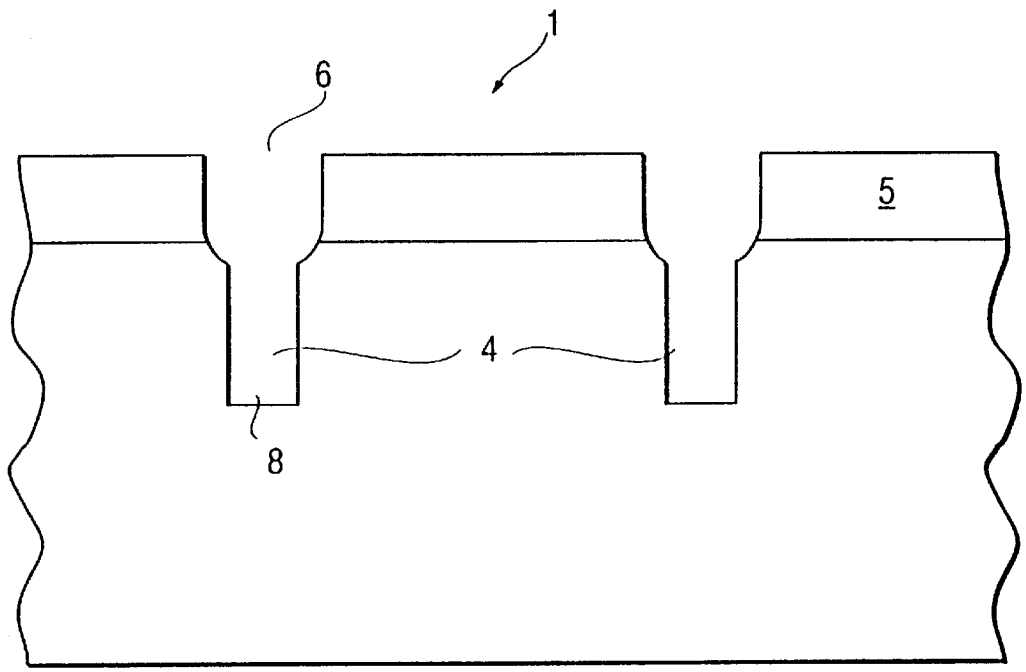
FIG. 3 is a partial front view of a first elongate strip according to the preferred embodiment of the present invention.

FIGS. 1 and 2 depict perspective views of a steam generator support grid array 10 according to the preferred embodiment of the present invention. The grid array 10 includes a plurality of interlocking first elongate strips 1 that are interlocked with a plurality of second elongate strips 2. The cross section of each of the first and second elongate strips 1, 2 includes protuberant portions 5, that give the strips 1, 2 somewhat of a T-shaped cross section. These first and second elongate strips 1, 2 are interlocked via a plurality of slots 4 positioned along the non-protuberant portion of the first elongate strips 1. As indicated in FIG. 3, the slots 4 include an open end 6 and a closed end 8. The open end 6 is wider than the remaining portion of the slot 4, to facilitate receiving the protuberant portions 5 of the elongate strips received in the slots.

Figure 4:
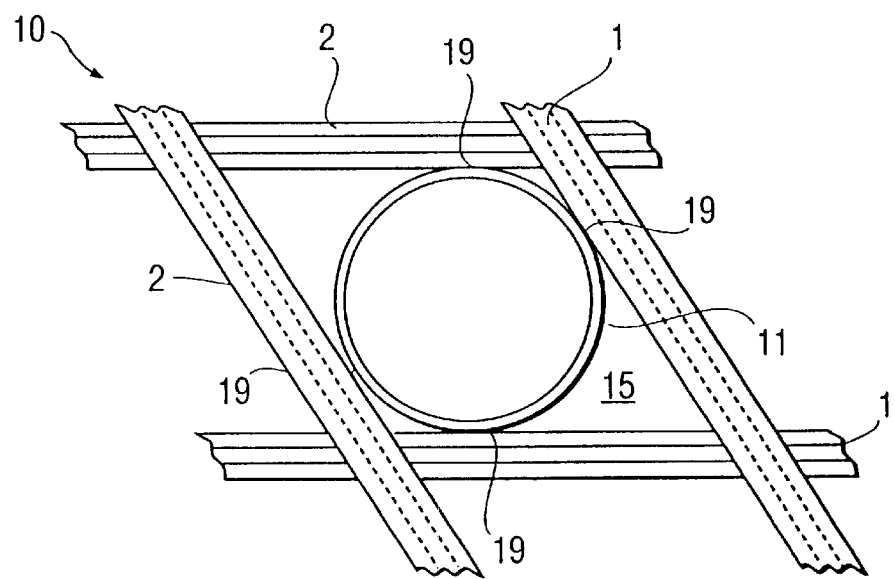
FIG. 4 is a partial top view of a support array according to the present invention.

FIG. 4 provides a top view of the support provided by the grid array 10 for a single steam generator tube 11 according to the preferred embodiment. In this example, first elongate strips 1 are interlocked together, and are also interlocked with second elongate strips 2. Extending upward through the space 15 formed by the interlocked elongate strips 1, 2 is a steam generator tube 11. As can be seen, the slots (not shown in FIG. 4) are spaced apart such that the space 15 allows the tube 11 to contact the elongate strips 1, 2 at least at four contact points 19, thereby providing lateral support for the tube 11. Because the first and second elongate strips 1, 2 each have the T-shaped cross section described above, continuous contact length is limited to the protuberant portions 5 of each strip. This reduced contact length between the steam generator tubes 11 and the elongate strips 1, 2, results in a reduction of the surface area in which sludge can concentrate. Since sludge accumulation is a major contributor to the onset of stress corrosion cracking, the area of each tube 11 that will undergo attack by stress corrosion cracking is reduced. Moreover, the contact area that does exist between the tubes 11 and the elongate strips 1, 2 is less than the critical length. Thus, even if stress corrosion cracking occurs in the remaining contact area, any cracking will not reach the critical length value.

The ordinarily skilled artisan will, of course, understand that the invention is not limited to the preferred embodiment described and depicted. For example, while the preferred embodiment depicts the first and second elongate strips as being of unequal height (with two-inch and one-inch heights, respectively, being the preferred heights), this need not be the case. Moreover, as can be seen in the depicted example of FIG. 4, in the preferred embodiment the elongate strips are not perpendicularly arranged, though such an arrangement is not precluded. Several alternative embodiments of the present invention will now be described.

Figure 5:
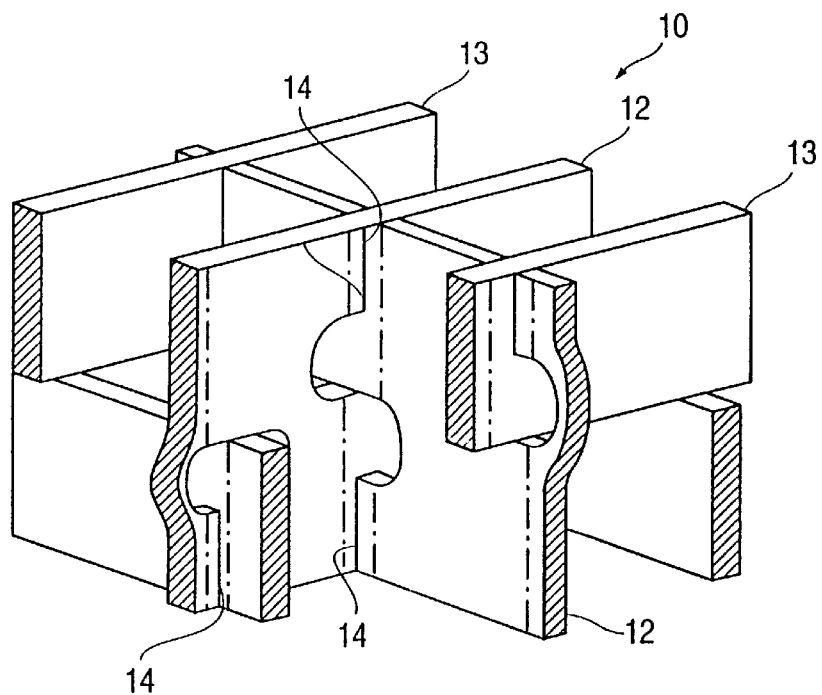
FIG. 5 is a partial perspective view according to an alternative embodiment of the present invention.

FIG. 5 depicts a partial perspective view of a steam generator tube support grid array 10 according to a first alternative embodiment of the present invention. The grid array 10 includes a plurality of interlocking first elongate strips 12 that are interlocked with a plurality of second elongate strips 13. These first and second elongate strips 12, 13 are interlocked via a plurality of slots 14 positioned along the length of the first elongate strips 12. The ordinarily skilled artisan will, of course, understand that this figure is not limited to the depicted configuration. Indeed, the first elongate strips 12 could have a plurality of interlocking slots 14 on only the top portion, or only the bottom portion.

Figure 6:
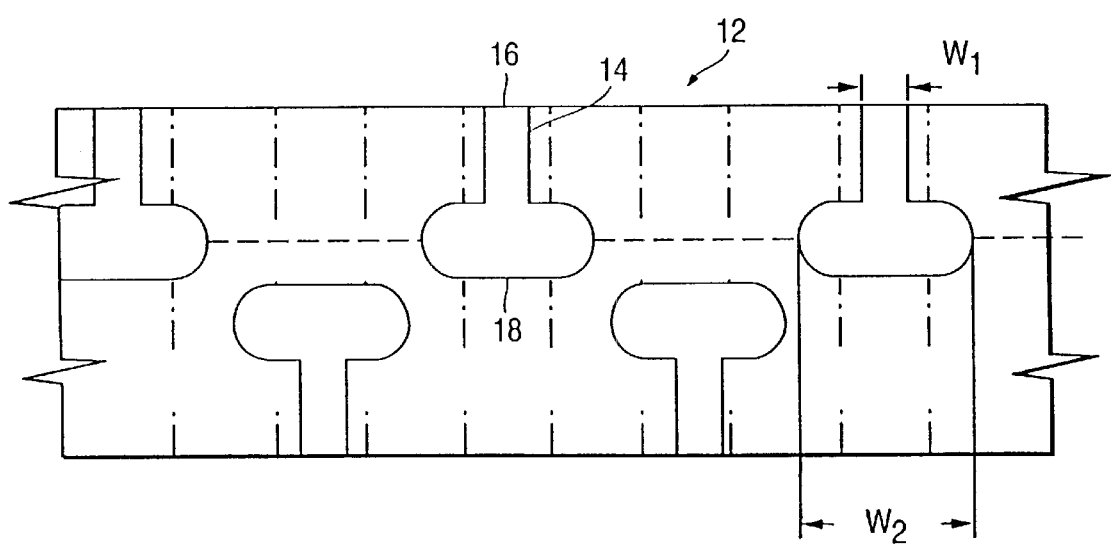
FIG. 6 is a partial front view of an alternative embodiment of a first elongate strip according to an alternative embodiment of the present invention.

Referring to FIG. 6, each of the slots 14 positioned along a first strip 12 has an open top portion 16 and a closed bottom portion 18. The closed bottom portion 18 is significantly wider than the remainder of the slot 14. Specifically, each of the slots 14 has a width W1 that allows either another one of the first elongate strips 12, or one of the second elongate strips 13, to fit snugly within the slot 14. The width W1 further provides sufficient room for angular displacement between the elongate strips 12, 13 beyond 90-degrees, if so desired (see FIG. 4). The closed bottom portion 18 has a larger width W2 than the remainder of the slot 14. This larger width W2 results in a reduction of the continuous contact length between the steam generator tubes 11 and the elongate strips 12, 13.

Figure 7:
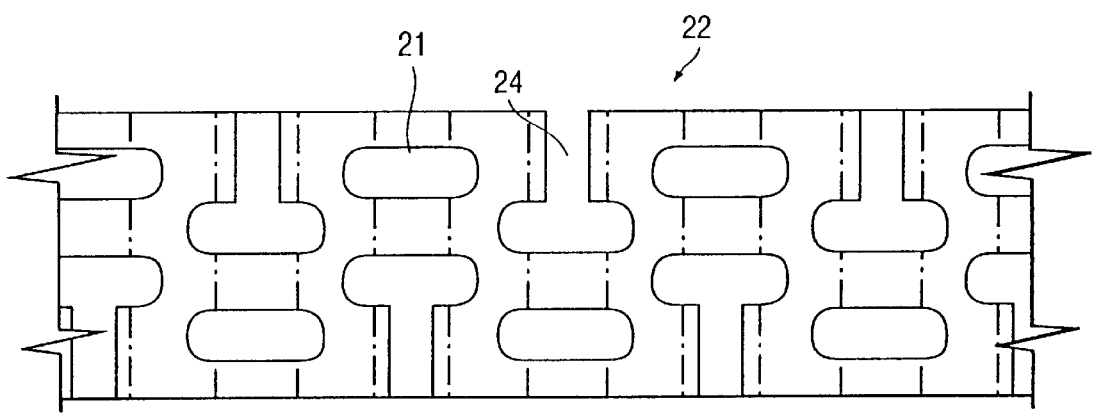
FIG. 7 is a partial front view of another embodiment of a first elongate strip according to the present invention.

Referring now to FIG. 7, another alternative embodiment of the present invention is depicted. In this embodiment, the first elongate strips 22 include slots 24, similar to those described in the first alternative embodiment. However, in addition to the slots 24, the first elongate strips 22 include holes 21 positioned between each set of slots 24. These additional holes 21 further reduce the continuous contact length between the tubes 11 and the strips 22.

Figure 8:
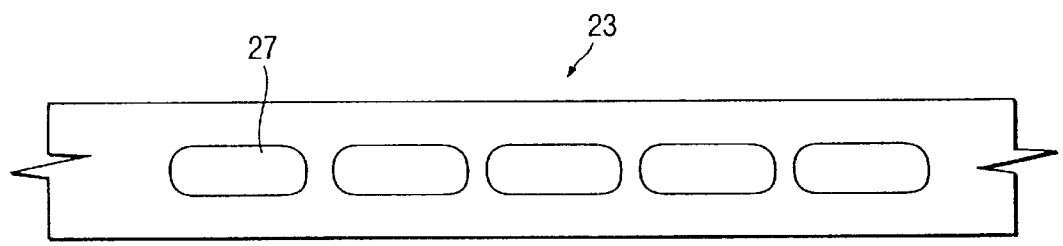
FIG. 8 is a partial front view of an embodiment of a second elongate strip according to the present invention.

In addition to the first elongate strips including additional holes 21, the second elongate strips 23 may also include similarly arranged holes 27. This configuration is shown in FIG. 8. These holes 27, just as with the holes 21, further reduce the continuous contact length between the tubes 11 and the second elongate strips 23. The second elongate strips 23 depicted in FIG. 5 could be used with any of the previously discussed first elongate strips 12 or 22. Of course, if used with the first elongate strips 22 of the second embodiment, the continuous contact length between the tubes 11 and the strips 22, 23, is minimized relative to the other possible combinations.

Figure 9A:
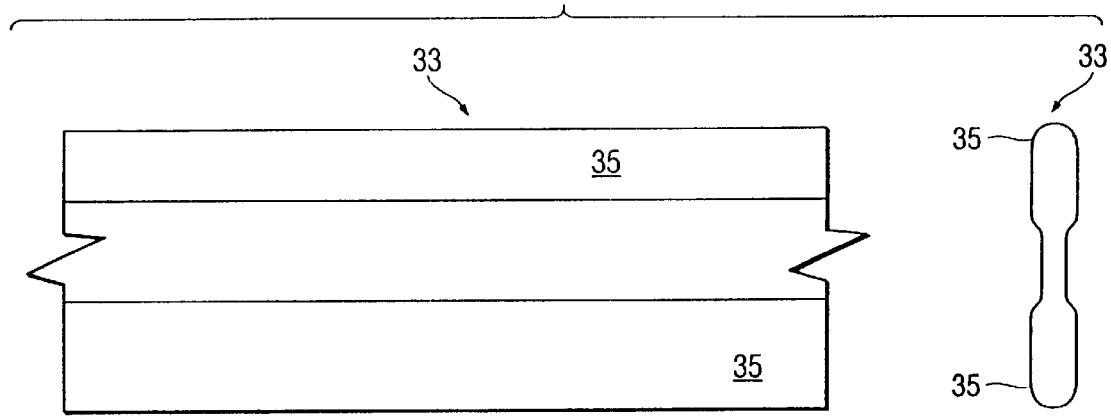
FIGS. 9(a) and 9(b) are partial front and cross section views of first and second elongate strips, respectively, according to yet another embodiment of the present invention.
Figure 9B:
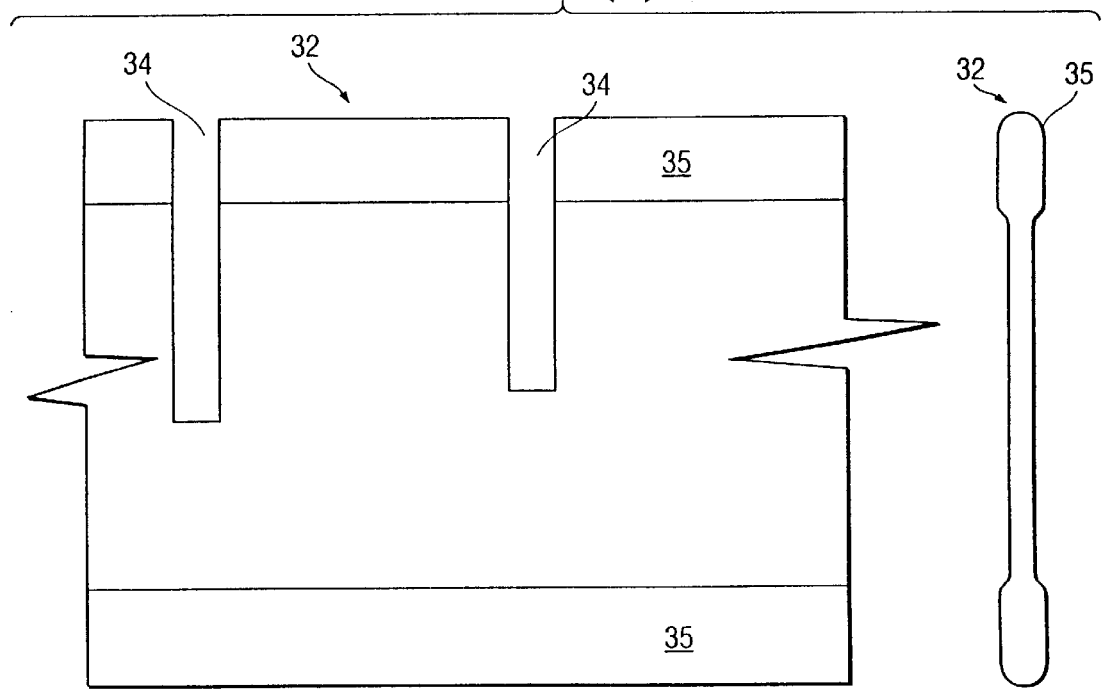

Another configuration for reducing the continuous contact length between the tubes and elongate strips is depicted in FIGS. 9(a) and 9(b). As shown in these figures, the cross section of the elongate strips 32, 33 includes protuberant portions 35, that give the strips 32, 33 somewhat of an I-shaped cross section. Each of the first elongate strips 32 includes slots 34 to allow interlocking of the strips 32, 33. Thus, as with the preferred embodiment, continuous contact length is limited because contact between the tubes 11 and the strips 32, 33 occurs only at the protuberant portions 35. Preferably, as depicted, the slots 34 are all located on the same side of the first elongate strips 32. This arrangement provides additional strength over placing the slots in alternating fashion along both sides of the first elongate strips 32. This is because with this configuration the unslotted portion of each strip 32 is a continuous linear structural member. However, the ordinarily skilled artisan will appreciate that this alternative configuration is not precluded.

Figure 10A:
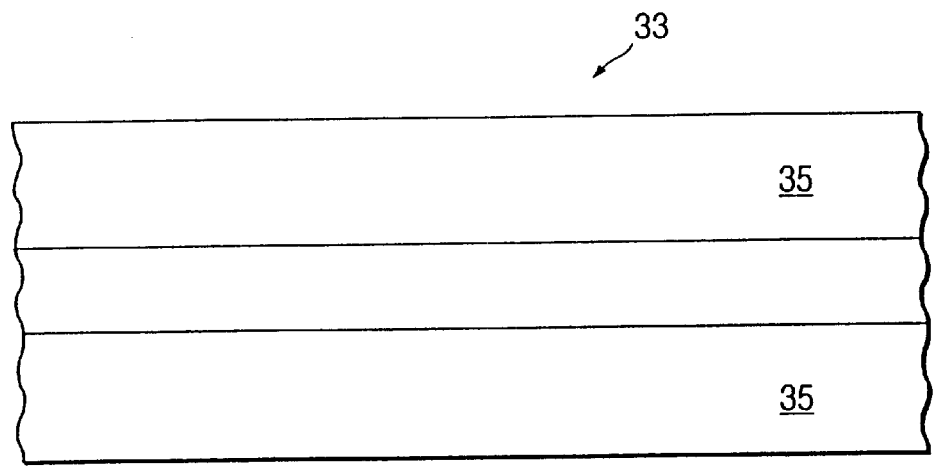
FIGS. 10(a) and 10(b) are front views of first and second elongate strips, respectively, according to a further embodiment of the present invention.
Figure 10B:
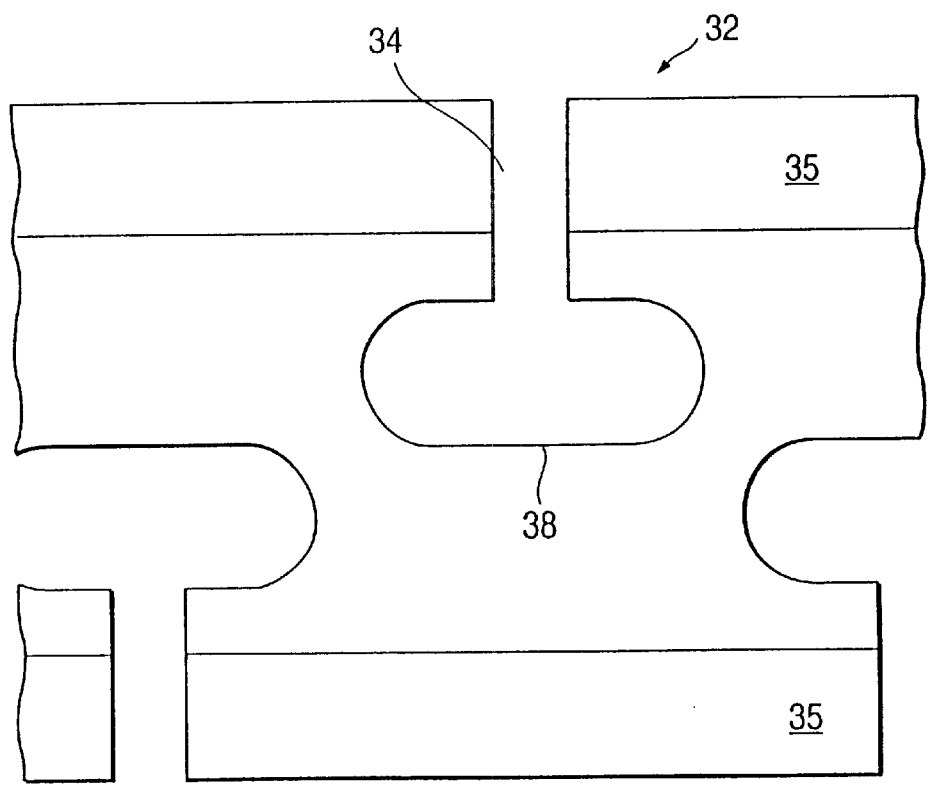
Figure 11:
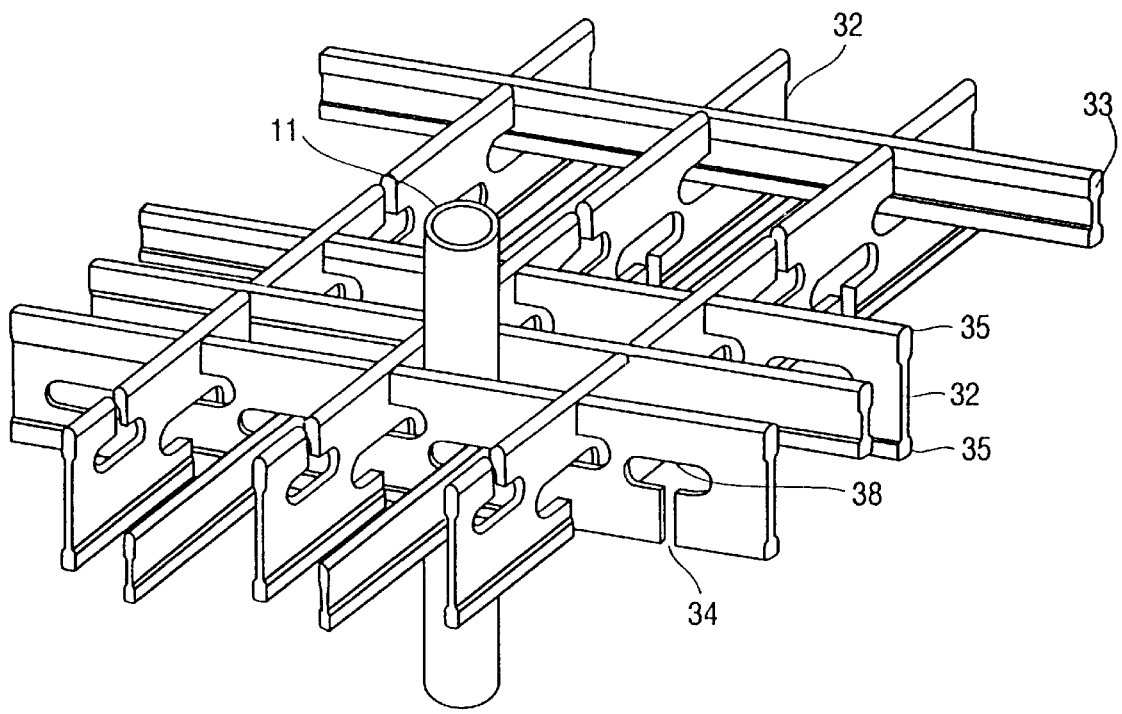
FIG. 11 is a partial perspective view of an embodiment incorporating the first and second elongate strips depicted in FIGS. 7(a) and 7(b).

It will be understood that the first elongate strip 32 depicted in FIG. 9(b) could include slots 34 having a singular, constant width, similar to those known in the prior art. Or, as depicted in FIG. 10(b), the slots 34 could be similar to the prior alternative embodiments, such that each slot 34 includes a widened closed bottom portion 38. In this case, the widened closed bottom portion 38 permits better flow of fluid around the tubes 11. This is because when these strips 32, 33 are interlocked, the contact between the tubes 11 and the strips 32, 33 occurs only at the protuberant portions 35, thereby reducing the continuous contact length between these components. A perspective view of a portion of an assembled grid array according to this embodiment is depicted in FIG. 11.

Figure 12A:
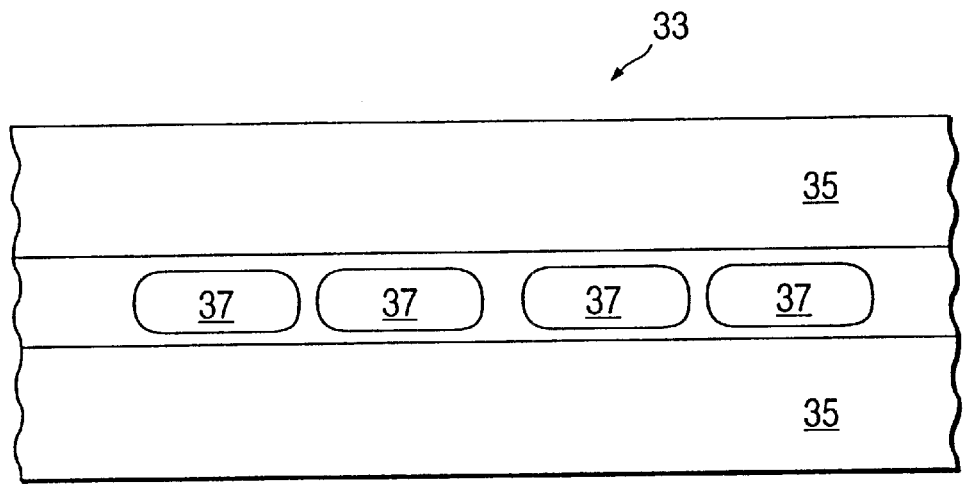
FIGS. 12(a) and 12(b) depict a further embodiment of first and second strips, respectively, of the present invention.
Figure 12B:
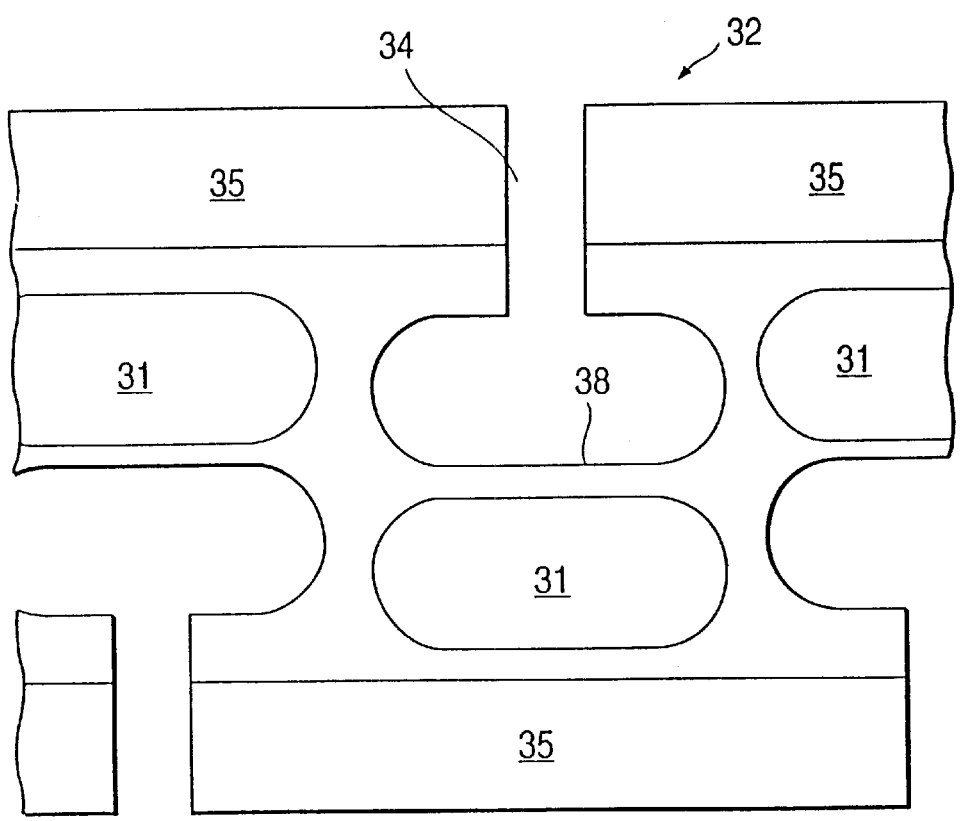

Additionally, as depicted in FIGS. 12(a) and 12(b), either or both of the elongate strips 32, 33 could further include holes 31 or 37, respectively, similar to the holes 21 and 27, respectively, of the prior embodiment. With this to configuration, the flow of fluid around the tubes 11 would be further enhanced.

Figure 13A:
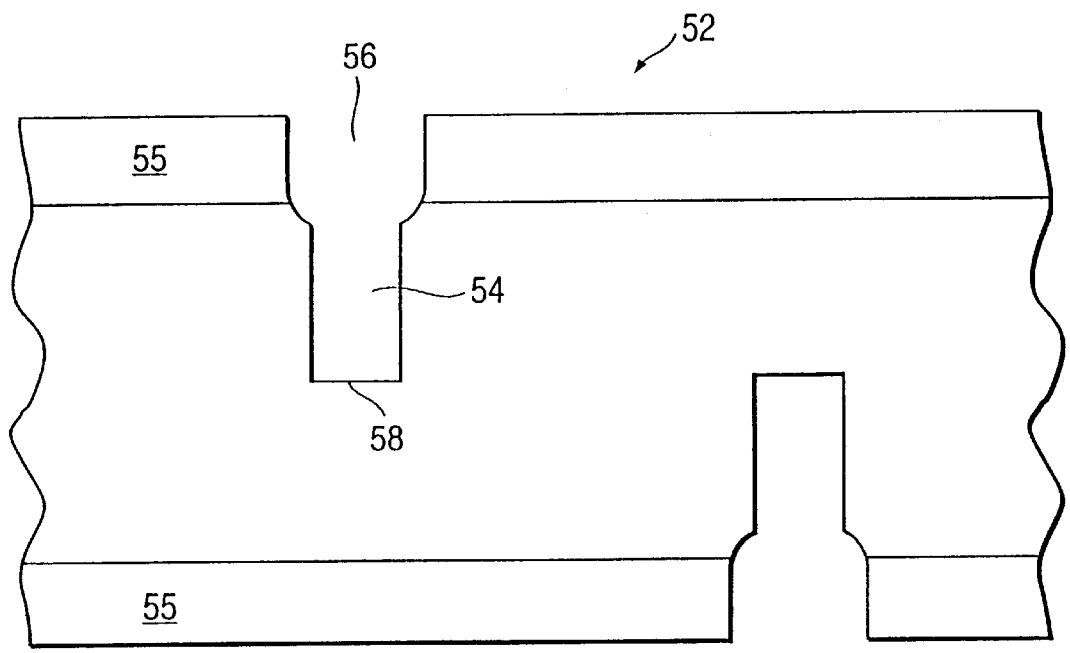
FIGS. 13(a) and 13(b) depict a front view of a first elongate strip, and cross section views of first and second elongate strips, respectively, of an additional embodiment according to the present invention.
Figure 13B:
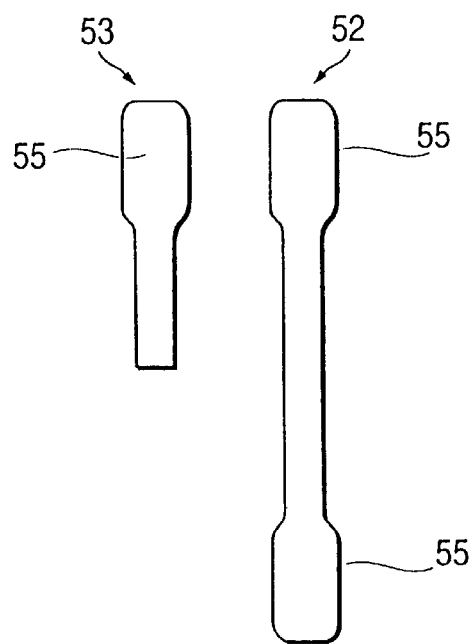

Still another arrangement for reducing the contact length between steam generator tubes and a support grid array is depicted in FIGS. 13(a) and 13(b). This arrangement is similar to the preferred embodiment; however, first elongate strips 52 include slots 54 arranged along the length of both sides of the first elongate strips 52. The first elongate strips 52 also include protuberant portions 55 on both ends thereof: Thus, the first elongate strips 52 have a somewhat I-shaped cross section. The second elongate strips 53 shown in cross section in FIG. 13(b) also include protuberant portions 55. However, the protuberant portions 55 on the second elongate strips are only included on one end thereof. Thus, the second elongate strips 53 have a somewhat T-shaped cross section.

The slots 54 in the embodiment of FIGS. 13(a) and 13(b), similar to the preferred embodiment, include an open end 56 and a closed end 58, with the open end 56 being wider than the remaining portion of the slot 54. The open end thus receives the protuberant portions 55 of the elongate strips that are placed into the slots 54.

Figure 14A:
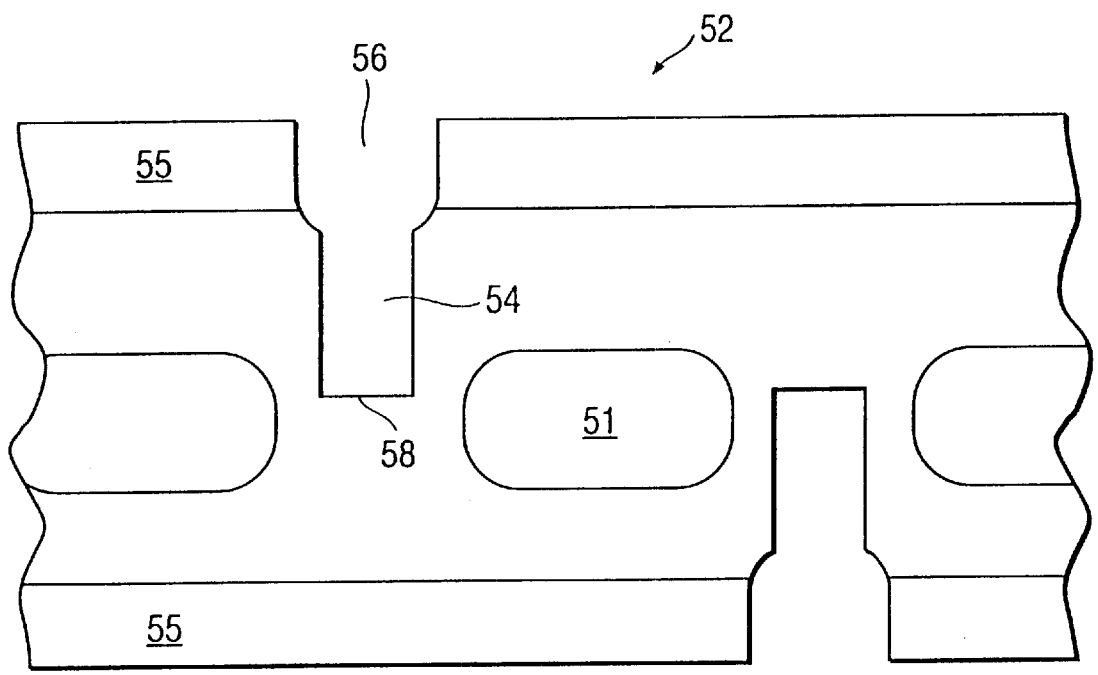
FIGS. 14(a) and 14(b) depict front views of first and second elongate strips, respectively, of a further embodiment according to the present invention.
Figure 14B:
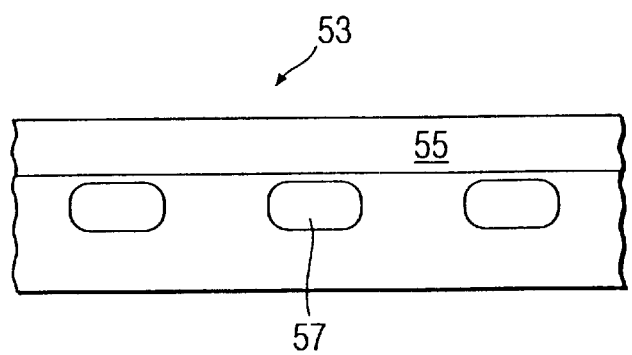

Each of the first elongate strips 52, according to this embodiment, could also include flow enhancement holes 51 between each slot, as shown in FIG. 14(b). Additionally, the second elongate strips 53 could include holes 57, similar to previously described embodiments, to further enhance the fluid flow around the tubes 11, as shown in FIG. 14(b).

The ordinarily skilled artisan will also appreciate that the preferred embodiment depicted in FIGS. 1–3 could also include flow enhancement holes. This variation is shown in FIGS. 15(a) and 15(b), wherein both the first 1 and second 2 elongate strips include flow enhancement holes 3, 7. It will be understood that these flow enhancement holes could be included in either the first 1 or second 2 elongate strips only, or in both.

Figure 16A:
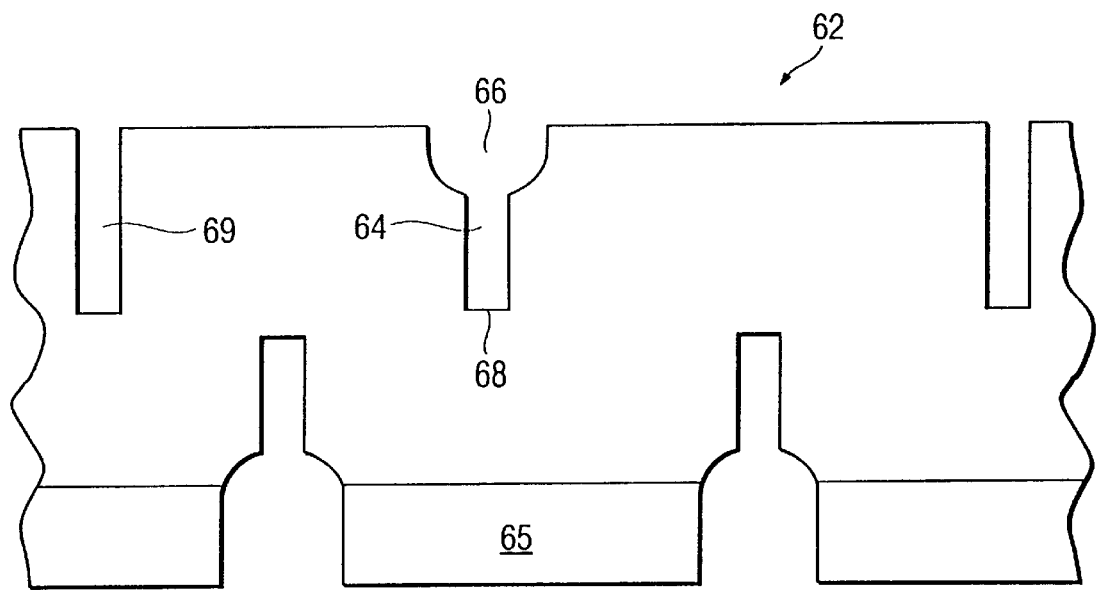
FIGS. 16(a) and 16(b) depict a front view of a first elongate strip, and cross section views of first and second elongate strips, respectively, of yet another embodiment, which is a variation of the embodiment depicted in FIGS. 13(a) and 13(b).
Figure 16B:
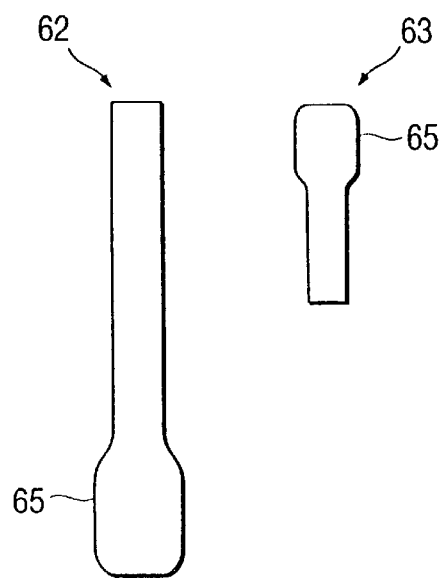

The next embodiment is depicted in FIGS. 16(a) and 16(b). This embodiment, much like the previous embodiments, comprises an array of first elongate strips 62 and second elongate strips 63. However, in this embodiment both the first and second elongate strips 62, 63 include a protuberant portion 65 on only one end. Thus, both first and second elongate strips 62, 63 have a somewhat T-shaped cross section. The first elongate strips 62 include slots 64 having an open end 66 wider than the remainder of the slot 64, and a closed end 68. As with the preferred embodiment and the embodiment depicted in FIGS. 13(a) and 13(b), the widened open ends 66 receive the protuberant portions 65 of the second elongate strips 63 that are placed into the slots 64.

Figure 17A:
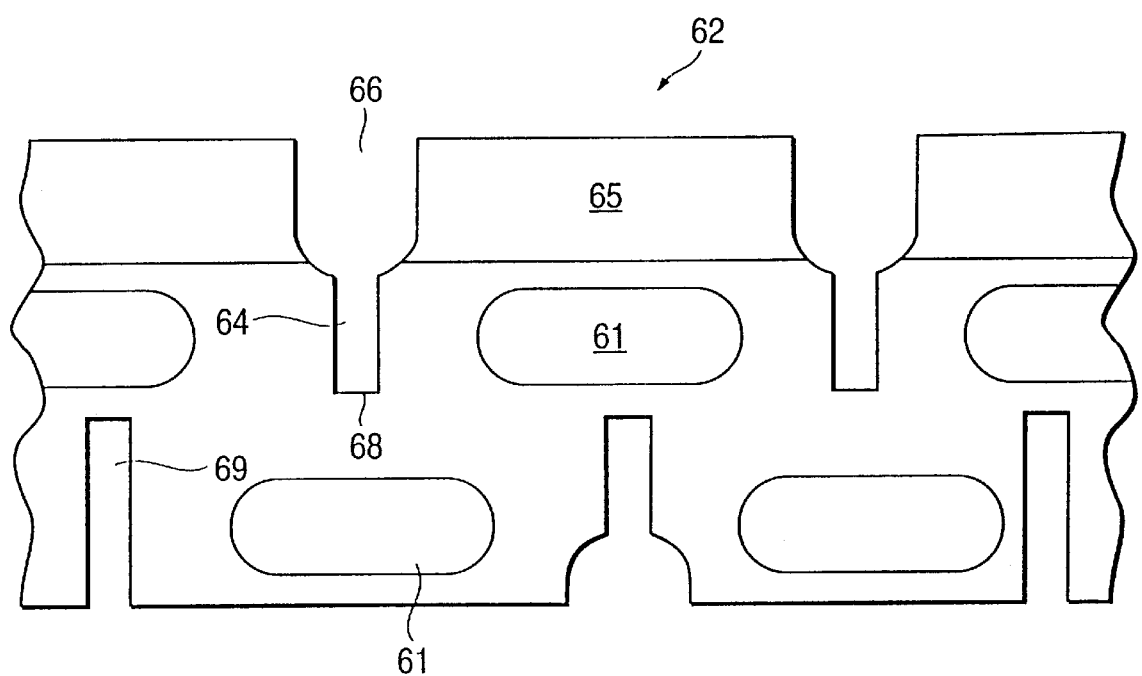
FIGS. 17(a) and 17(b) depict front views of first and second elongate strips, respectively, according to still a further embodiment of the present invention.
Figure 17B:
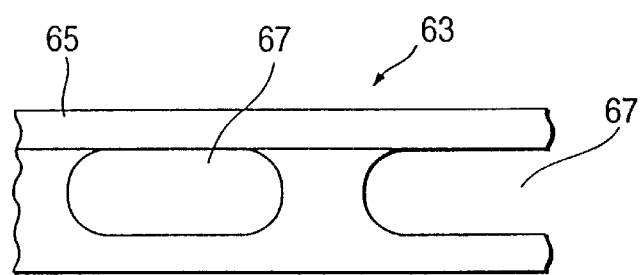

The first elongate strips 62 also include additional slots 69 for receiving another first elongate strip 62 therein. These slots 69 do not include any widened portion, but have constant widths throughout their lengths. As with the embodiments previously depicted, the first and second elongate strips 62, 63 could include holes 61, 67, respectively, to further enhance the fluid flow around the tubes 11, as shown in FIGS. 17(a) and 17(b). Although the depicted embodiments includes slots 64, 69 on both the top and bottom of first elongate strip 62, the ordinarily skilled artisan will appreciate that the slots 64, 69 could be included on only one of the portions, either the top or the bottom, if so desired.

Figure 18A:
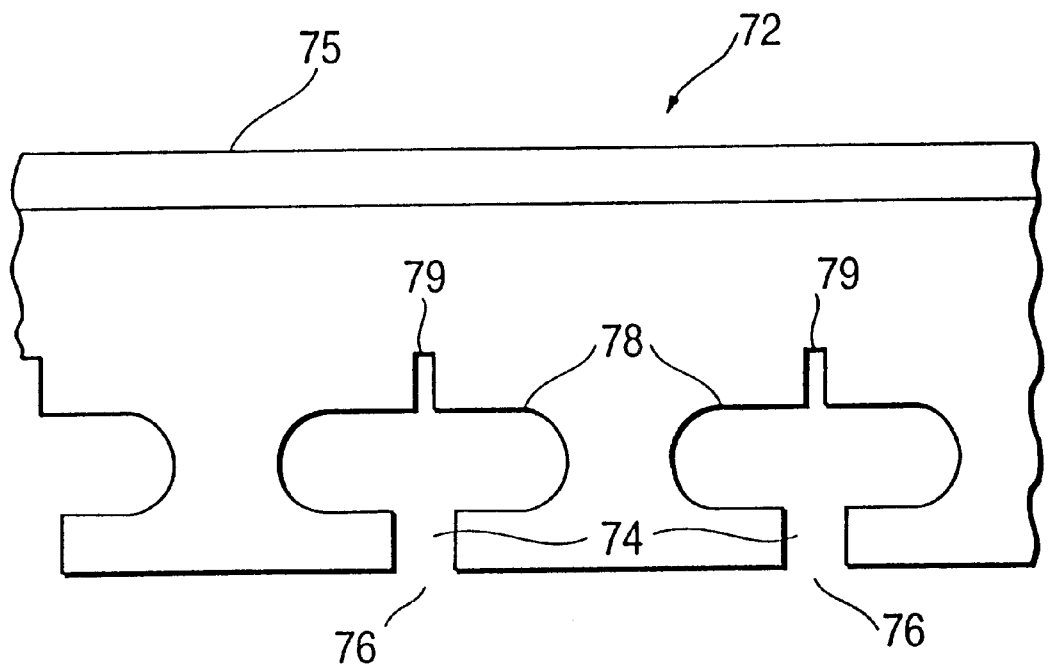
FIGS. 18(a) and 18(b) depict front views of first and second elongate strips, respectively, according to yet another embodiment of the present invention.
Figure 18B:
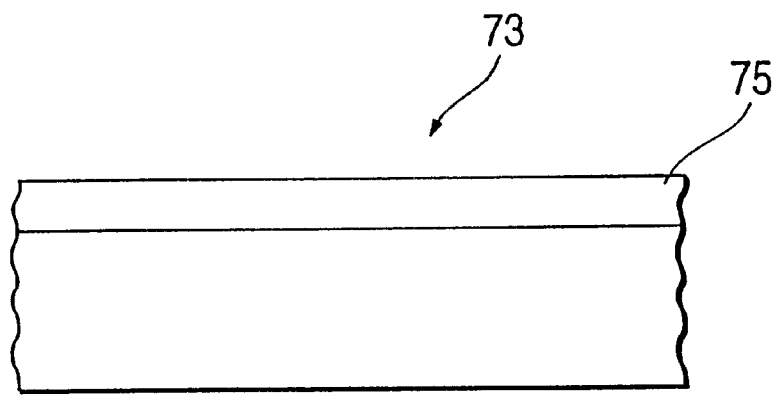
Figure 19:
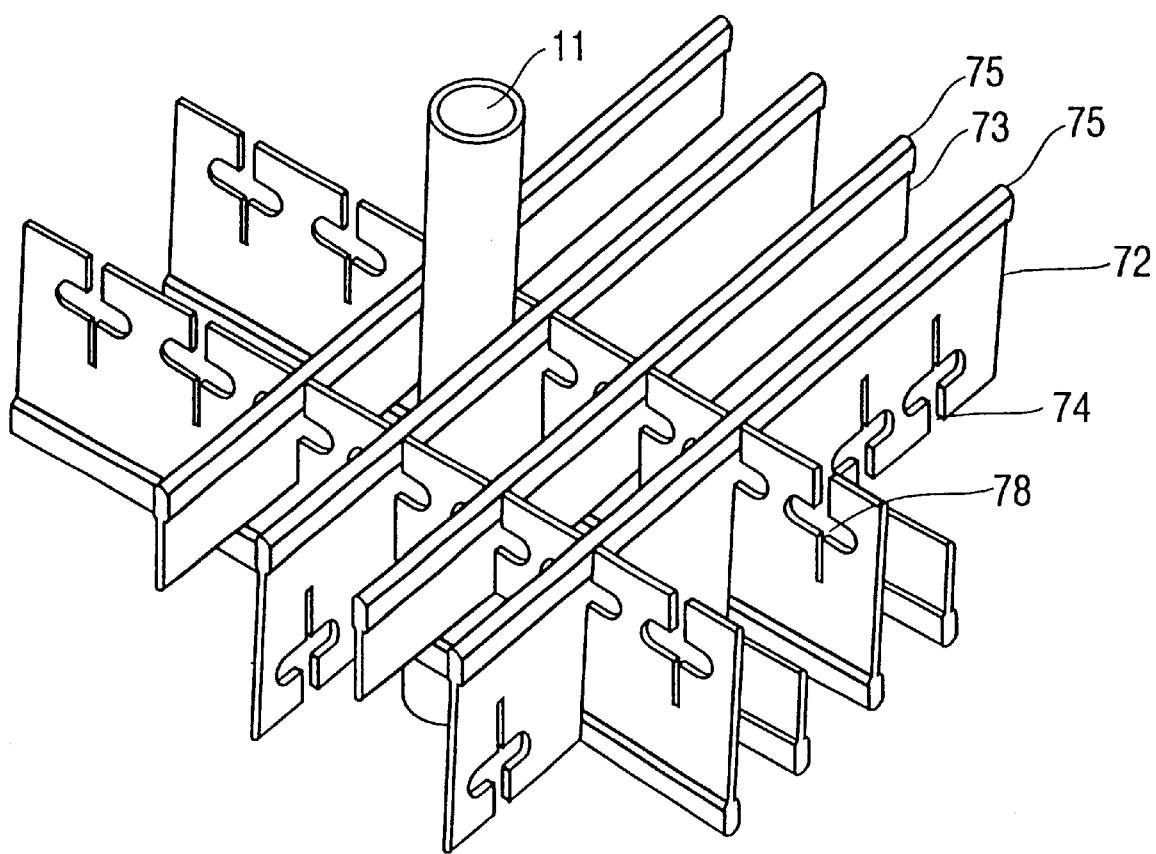
FIG. 19 is a partial perspective view of the embodiment depicted in FIGS. 18(a) and 18(b).

FIGS. 18(a) and 18(b) depict yet another embodiment of the present invention. This embodiment comprises an array of first elongate strips 72 and second elongate strips 73. As with the prior embodiment of FIGS. 16(a) and 16(b), the first and second elongate strips 72, 73 include protuberant portions 75, thus providing each with a substantially T-shaped cross section. However, in addition to this structural configuration providing reduced contact between the elongate strips 72, 73 and the steam generator tubes 11, first elongate strips 72 include slots 74 having a flow enhancing widened portion 78 therein. Unlike the previous embodiments that included a widened portion, the widened portion 78 of this embodiment is positioned intermediate the open end 76 and closed end 79 of each slot 74. A partial perspective view according to this embodiment is shown in FIG. 19.

Figure 20A:
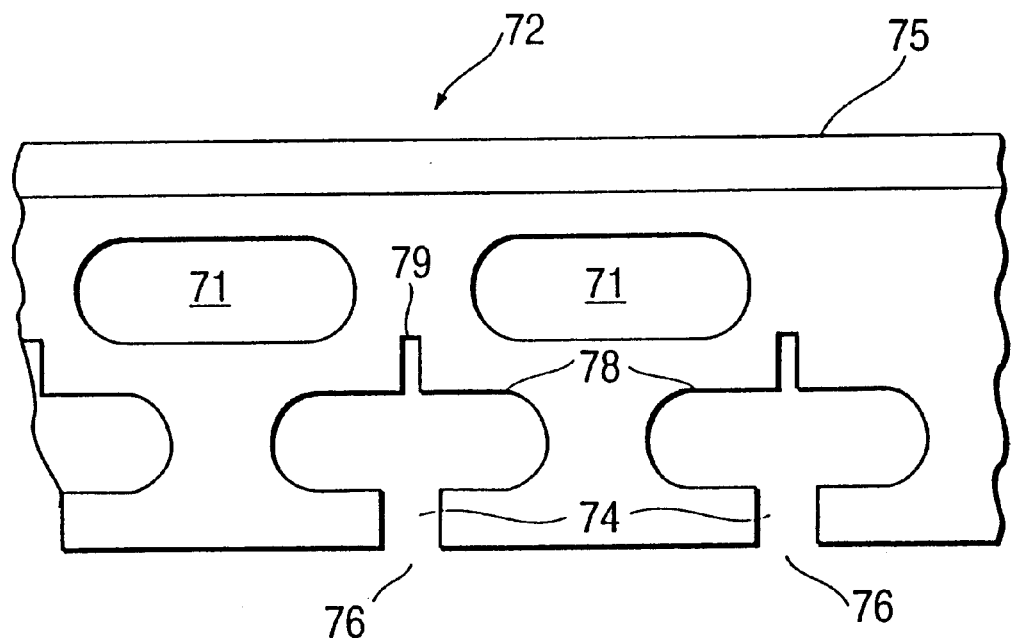
FIGS. 20(a) and 20(b) depict front views of first and second elongate strips, respectively, of a variation of the embodiments of FIGS. 18(a) and 18(b), respectively.
Figure 20B:
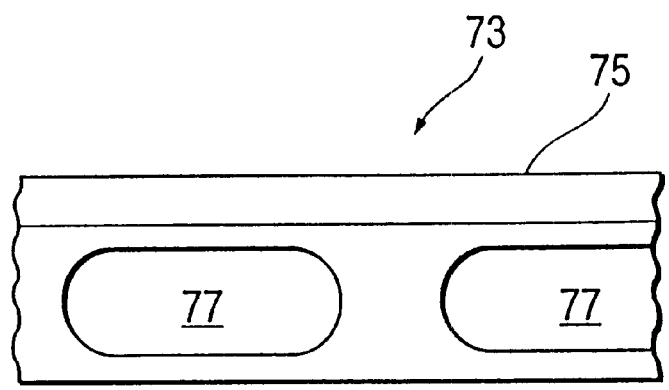

Again, as with the previous embodiments, it will be understood that the first and second elongate strips 72, 73 could also include holes 71, 77, respectively, to further enhance the fluid flow around the tubes 11. This variation is shown in FIGS. 20(a) and 20(b).

The final depicted embodiment is shown in FIGS. 21(a)–(d), and FIG. 19. This embodiment is similar to the preferred embodiment and to the alternative embodiment depicted in FIGS. 16(a) and 16(b), in that the elongate strips each have protuberant portions, giving each a substantially T-shaped cross section. This embodiment differs, however, in at least two ways. First, the slots are configured such that the protuberant portions of both strips are collocated when the grid array is configured. Second, this embodiment includes four different types of elongate strips.

Referring now to FIGS. 21(a)–(d), there are depicted first 91, second 102, third 203, and fourth 304 elongate strips, respectively. The first elongate strips 91 each include first and second slots 92 and 93, positioned alternately along that length of the strip 91 which includes the protuberant portion 99. The first and second slots 92, 93 are similarly shaped, but have differing longitudinal dimensions. Specifically, the first and second slots 92, 93 both include open portions 94, 95, respectively, and closed portions 96, 97, respectively. Additionally, the open portions 94, 95 are widened to receive the protuberant portions of the elongate strips each receives.

The first slots 92 are for receiving second elongate strips 102, and the second slots 93 are for receiving third elongate strips 203, both of which are described further below.

The second elongate strips 102 each include third and fourth slots 103, 104 positioned alternately along the length of the strips 102. However, the third and fourth slots 103, 104 are located on opposite portions of the strips 102. The fourth slots 104 are positioned along the length of the strip 102 that includes the protuberant portion 109. Also, the third and fourth slots 103, 104 have differing geometric configurations. Specifically, the third slots 103 each have a constant width from the open end 105 to the closed end 107. Conversely, the fourth slots 104 each have an open end 106 that is wider than the closed end 108. The wider open end 106 enables the second strip 102 to receive the protuberant portions of other elongate strips. The third slots 103 are for receiving the first elongate strips 91 via the first slots 92. The fourth slots 104 arc for receiving the fourth 304 elongate strips, which will be discussed further below.

The third elongate strips 203 each include fifth and sixth slots 204, 205 positioned alternately along that length of the elongate strip 203 opposite that portion which includes the protuberant portion 209. Both the fifth and sixth slots 204, 205 have constant widths from the open ends 206, 208, respectively, to the closed ends 207, 209, respectively. The fifth slots 204 are for receiving first elongate strips 91 via the first slots 92, and the sixth slots 205 are for receiving the fourth elongate strips 304, which will now be discussed.

Figure 21A:
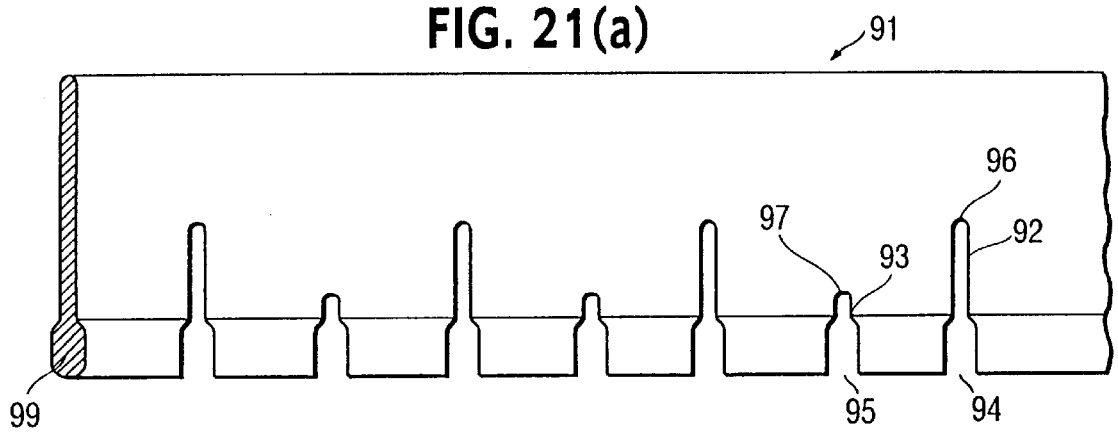
FIGS. 21(a)–(d) depict front views of first, second, third, and fourth elongate strips according to a final embodiment of the present invention.
Figure 21B:
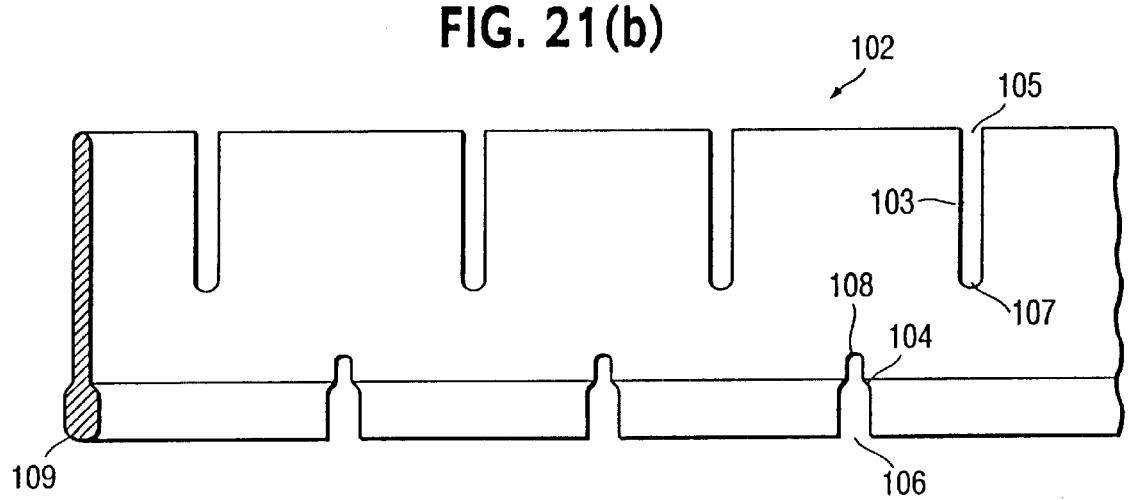
Figure 21C:
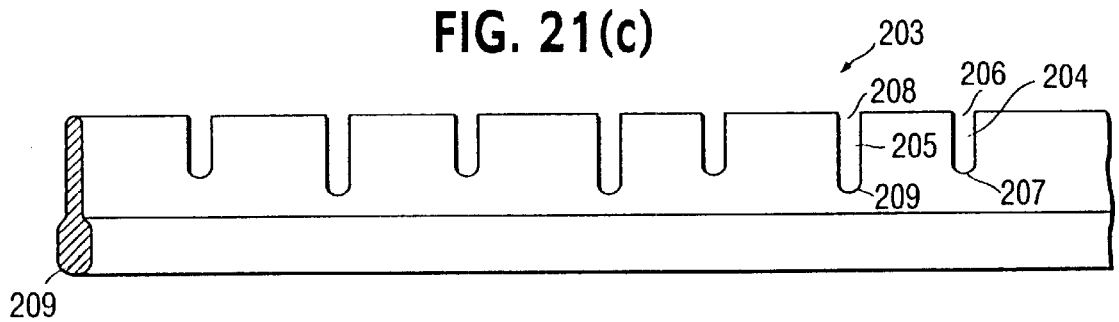
Figure 21D:
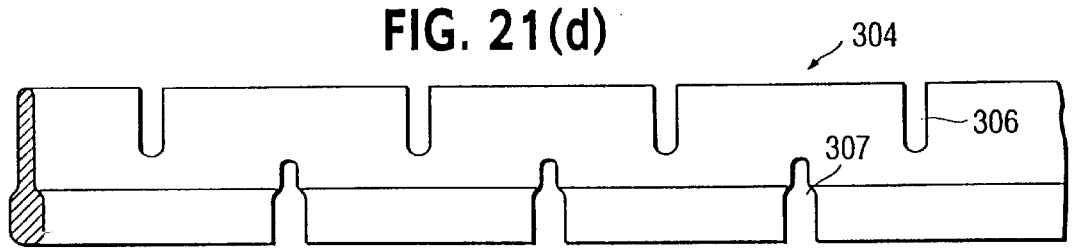

The fourth elongate strips 304, depicted in FIG. 21(d), are similar to the second elongate strips 102. Specifically, each have seventh and eighth slots 306, 307 positioned alternately along the length of the strips 304, with the seventh and eighth slots 306, 307 located on opposite portions of the strips 304. The seventh slots 306 are positioned along the length of the elongate strips 304 that include the protuberant portion 309, and the eighth slots 307 are positioned on the opposite portion. The seventh slots 306 are for receiving the second elongate strips 102 via the third slots 103, and the eighth slots 307 are for receiving the third elongate strips 203.

Figure 22:
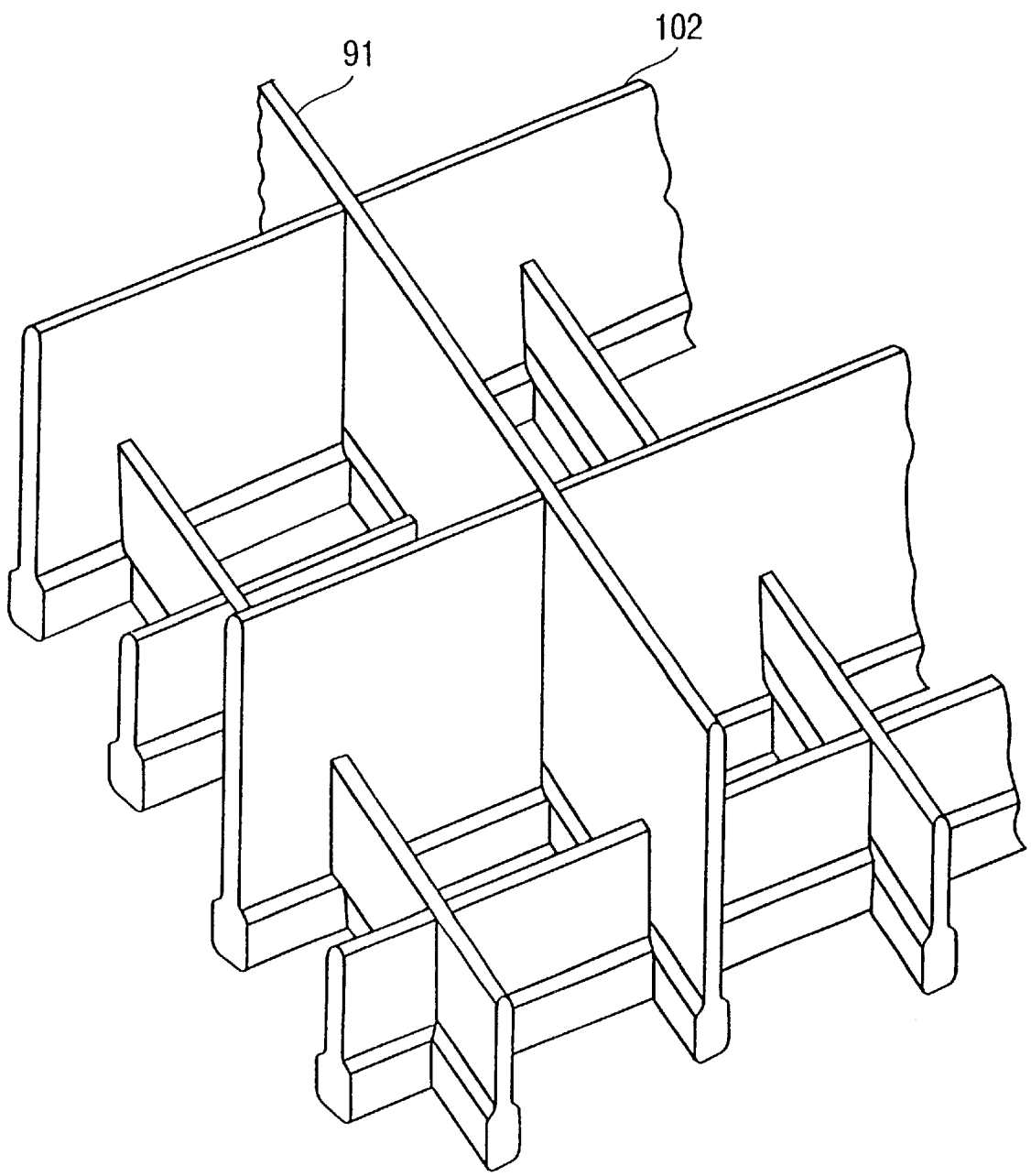
FIG. 22 is a partial perspective view of the embodiment incorporating the strips depicted in FIGS. 21(a)–(d).

The particular arrangement for this embodiment is shown, in partial perspective view, in FIG. 22. As can be seen, each of the protuberant portions on each elongate strip are collocated when the grid array is constructed.

It will be clear to the ordinarily skilled artisan that the above-described embodiments are not limited to that explicitly described and depicted. For example, the ordinarily skilled artisan will appreciate that the slot configuration, wherein the widened portion is intermediate the open end and the closed end, could also be incorporated into any of the disclosed embodiments. Moreover, any of the disclosed embodiments may also include the holes positioned between each slot, though not specifically disclosed in all of the embodiments.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

We claim:

1. A support structure for tubes within a steam generator, comprising:

a plurality of first elongate strips;

a plurality of first slots each having an open end positioned at a top portion of said first elongate strips and a closed end positioned proximate a center portion of said first elongate strips, a width of the closed end of said first slots being greater than a width of the open end thereof; and a plurality of second elongate strips, each being received into one of said plurality of first slots.

2. A support structure for tubes within a steam generator according to claim 1, further comprising:

a plurality of second slots, arranged in alternating fashion with said first slots along a length of each of said first elongate strips, each of said second slots having an open end positioned at a bottom portion of said first elongate strips and a closed end positioned proximate the center portion of said first elongate strips, a width of the closed end of said second slots being greater than a width of the open end thereof; and a plurality of said second elongate strips being received into one of said plurality of second slots.

3. A support structure for tubes within a steam generator, comprising:

a plurality of first elongate strips;

a plurality of first slots each having an open end positioned at a top portion of said first elongate strips and a closed end positioned proximate a center portion of said first elongate strips, a width of the closed end of said first slots being greater than a width of the open end thereof;

a plurality of second elongate strips, each being received into one of said plurality of first slots; and a plurality of holes extending through each of said first elongate strips, said holes being positioned proximate the closed end of each of said first slots.

4. A support structure for tubes within a steam generator, comprising:

a plurality of first elongate strips, said first elongate strips defining:

a plurality of first slots each having an open end positioned at a top portion of said first elongate strips and a closed end positioned proximate a center portion of said first elongate strips, a width of the closed end of said first slots being greater than a width of the open end thereof;

a plurality of second slots, arranged in alternating fashion with said first slots along a length of each of said first elongate strips, each of said second slots having an open end positioned at a bottom portion of said first elongate strips and a closed end positioned proximate the center portion of said first elongate strips, a width of the closed end of said second slots being greater than a width of the open end thereof; and a plurality of holes extending through each of said first elongate strips, said holes being positioned between each of said plurality of first slots and between each of said plurality of first slots and between each of said plurality of second slots; and a plurality of second elongate strips, each being received into one of said plurality of first slots and one of said plurality of second slots.

5. A support structure for tubes within a steam generator according to any one of claims 3 or 4, further comprising:

a plurality of spaced apart holes extending through each of said second elongate strips.

6. A support structure for tubes within a steam generator according to any one of claims 3 or 4, further comprising:

a plurality of spaced apart holes extending through each of said second elongate strips; and wherein said second elongate strips each have a cross section including a first protuberant portion.

7. A support structure for tubes within a steam generator according to claim 6, wherein each said first protuberant portion is positioned such that said second elongate strips each have a substantially T-shaped cross section.

8. A support structure for tubes within a steam generator according to claim 6, wherein said second elongate strips each have a cross section including a second protuberant portion.

9. A support structure for tubes within a steam generator according to claim 8, wherein each said first and second protuberant portions are positioned such that said second elongate strips each have a substantially I-shaped cross section.

10. A tube support grid for tubes within a steam generator according to claim 6, wherein the cross sections of said first and second elongate strips each further include a plurality of protuberant portions positioned such that said first and second elongate strips have a substantially I-shaped cross section.

11. A support grid for tubes within a steam generator, comprising:

a plurality of first elongate strips having a cross section including a first protuberant portion, each of said first elongate strips further including a plurality of first slots arranged along a length thereof; and a plurality of second elongate strips having a cross section including a second protuberant portion, each of said second elongate strips being received into one of said plurality of first slots;

wherein each of said first slots includes a portion having a width dimensioned so as to receive said protuberant portions and said first and second protuberant portions are positioned such that said first and second elongate strips have a substantially T-shaped cross section.

12. A tube support grid for tubes within a steam generator according to claim 11, further comprising:

a plurality of second slots arranged in alternating fashion with said first slots along a length of each of said first elongate strips.

13. A support structure for tubes within a steam generator according to claim 12, further comprising:

a plurality of holes extending through each of said first elongate strips, said holes being positioned between each of said plurality of first slots and between each of said plurality of second slots; and a plurality of spaced apart holes extending through each of said second elongate strips.

14. A support structure for tubes within a steam generator according to claim 12, further comprising:

a plurality of spaced apart holes extending through each of said second elongate strips.

15. A tube support grid for tubes within a steam generator according to claim 12, wherein said second slots are arranged along a length of each of said first elongate strips at a position opposite said first protuberant portion.

16. A support structure for tubes within a steam generator according to claim 15, further comprising:

a plurality of holes extending through each of said first elongate strips, said holes being positioned between each of said plurality of first slots and between each of said plurality of second slots; and a plurality of spaced apart holes extending through each of said second elongate strips.

17. A support structure for tubes within a steam generator according to claim 15, further comprising:
- a plurality of spaced apart holes extending through each of said second elongate strips.

18. A support grid for tubes within a steam generator, comprising: a plurality of first elongate strips having a cross section including a first protuberant portion, each of said first elongate strips further including a plurality of first slots arranged along a length thereof; and a plurality of second elongate strips having a cross section including a second protuberant portion, each of said second elongate strips being received into one of said plurality of first slots; wherein:
- the cross section of said first elongate strips further include a third protuberant portion, said first and third protuberant portions being positioned such that said first elongate strips have a substantially I-shaped cross section; and
- said second protuberant portion is positioned such that said second elongate strips have a substantially T-shaped cross section.

19. A tube support grid for tubes within a steam generator according to claim 18, wherein each of said first slots includes a portion having a width dimensioned so as to receive said second protuberant portions.

20. A tube support grid for tubes within a steam generator according to any one of claims 18 or 19, further comprising:
- a plurality of second slots arranged in alternating fashion with said first slots along a length of each of said first elongate strips.

21. A support structure for tubes within a steam generator according to claim 20, further comprising:
- a plurality of holes extending through each of said first elongate strips, said holes being positioned between each of said plurality of first slots and between each of said plurality of second slots.

22. A support structure for tubes within a steam generator according to claim 20, further comprising:
- a plurality of spaced apart holes extending through each of said second elongate strips.

23. A support structure for tubes within a steam generator according to claim 20, further comprising:
- a plurality of holes extending through each of said first elongate strips, said holes being positioned between each of said plurality of first slots and between each of said plurality of second slots; and
- a plurality of spaced apart holes extending through each of said second elongate strips.

24. A tube support grid for tubes within a steam generator according to claim 20, wherein said second slots are arranged along a length of each of said first elongate strips at a position opposite said first protuberant portion.

25. A support structure for tubes within a steam generator according to claim 24, further comprising:
- a plurality of holes extending through each of said first elongate strips, said holes being positioned between each of said plurality of first slots and between each of said plurality of second slots.

26. A support structure for tubes within a steam generator according to claim 24, further comprising:
- a plurality of spaced apart holes extending through each of said second elongate strips.

27. A support structure for tubes within a steam generator according to claim 24, further comprising:
- a plurality of holes extending through each of said first elongate strips, said holes being positioned between each of said plurality of first slots and between each of said plurality of second slots; and
- a plurality of spaced apart holes extending through each of said second elongate strips.

28. A support grid for tubes within a steam generator, comprising: a plurality of first elongate strips having a cross section including a first protuberant portion, each of said first elongate strips further including a plurality of first slots arranged along a length thereof; and a plurality of second elongate strips having a cross section including a second protuberant portion, each of said second elongate strips being received into one of said plurality of first slots; wherein the cross sections of said first and second elongate strips each further include a third and fourth protuberant portion, respectively, said first, second, third and fourth protuberant portions being positioned such that said first and second elongate strips have a substantially I-shaped cross section.

29. A tube support grid for tubes within a steam generator according to claim 28, wherein each of said first slots includes a portion having a width dimensioned so as to receive said second protuberant portions.

30. A tube support grid for tubes within a steam generator according to claim 28, further comprising:
- a plurality of second slots arranged in alternating fashion with said first slots along a length of each of said first elongate strips.

31. A support structure for tubes within a steam generator according to claim 30, further comprising:
- a plurality of holes extending through each of said first elongate strips, said holes being positioned between each of said plurality of first slots and between each of said plurality of second slots.

32. A support structure for tubes within a steam generator according to claim 30, further comprising:
- a plurality of spaced apart holes extending through each of said second elongate strips.

33. A support structure for tubes within a steam generator according to claim 30, further comprising:
- a plurality of holes extending through each of said first elongate strips, said holes being positioned between each of said plurality of first slots and between each of said plurality of second slots; and
- a plurality of spaced apart holes extending through each of said second elongate strips.

34. A tube support grid for tubes within a steam generator according to claim 30, wherein said second slots are arranged along a length of each of said first elongate strips at a position opposite said first protuberant portion.

35. A support structure for tubes within a steam generator according to claim 34, further comprising:
- a plurality of holes extending through each of said first elongate strips, said holes being positioned between each of said plurality of first slots and between each of said plurality of second slots.

36. A support structure for tubes within a steam generator according to claim 34, further comprising:
- a plurality of spaced apart holes extending through each of said second elongate strips.

37. A support structure for tubes within a steam generator according to claim 34, further comprising:
- a plurality of holes extending through each of said first elongate strips, said holes being positioned between each of said plurality of first slots and between each of said plurality of second slots; and
- a plurality of spaced apart holes extending through each of said second elongate strips.

38. A tube support grid for tubes within a steam generator according to any one of claims 11, 18, 19 or 28, further comprising:
    a plurality of spaced apart holes extending through each of said first elongate strips.

39. A tube support grid for tubes within a steam generator according to any one of claims 11, 18, 19 or 28, further comprising:
    a plurality of spaced apart holes extending through each of said second elongate strips.

40. A tube support grid for tubes within a steam generator according to any one of claims 11, 18, 19 or 28, further comprising:
    a plurality of spaced apart holes extending through each of said first elongate strips; and
    a plurality of spaced apart holes extending through each of said second elongate strips.

41. A lateral support grid array for steam generator tubes, comprising:
    a plurality of first elongate strips;
    a plurality of first slots each having an open end positioned at a top portion of said first elongate strips and a closed end positioned proximate a center portion of said first elongate strips, a portion of said first slot intermediate the open end and the closed end having a width greater than a width of the open end and the closed end thereof; and
    a plurality of second elongate strips, each being received into one of said plurality of first slots.

42. A support structure for tubes within a steam generator according to claim 41, further comprising:
    a plurality of second slots, arranged in alternating fashion with said first slots along a length of each of said first elongate strips, each of said second slots having an open end positioned at a bottom portion of said first elongate strips and a closed end positioned proximate the center portion of said first elongate strips, a width of the closed end of said second slots being greater than a width of the open end thereof; and
    a plurality of said second elongate strips being received into one of said plurality of second slots.

43. A support structure for tubes within a steam generator according to claim 42, further comprising:
    a plurality of holes extending through each of said first elongate strips, said holes being positioned between each of said plurality of first slots and between each of said plurality of second slots.

44. A support structure for tubes within a steam generator according to claim 41, further comprising:
    a plurality holes extending through each of said first elongate strips, said holes being positioned proximate the closed end of each of said first slots.

45. A support structure for tubes within a steam generator according to any one of claims 41, 42, 44, or 43 further comprising:
    a plurality of spaced apart holes extending through each of said second elongate strips.

46. A support structure for tubes within a steam generator according to any one of claims 41, 40, 44, or 43 further comprising:
    a plurality of spaced apart holes extending through each of said second elongate strips; and
    wherein said second elongate strips each have a cross section including a first protuberant portion.

47. A support structure for tubes within a steam generator according to claim 46, wherein each said first protuberant portion is positioned such that said second elongate strips each have a substantially T-shaped cross section.

48. A support structure for tubes within a steam generator according to claim 47, wherein each said first and second protuberant portions are positioned such that said second elongate strips each have a substantially I-shaped cross section.

49. A support structure for tubes within a steam generator according to claim 46, wherein said second elongate strips each have a cross section including a second protuberant portion.

50. A tube support grid for tubes within a steam generator according to claim 46, wherein the cross sections of said first and second elongate strips each further include a plurality of protuberant portions positioned such that said first and second elongate strips have a substantially I-shaped cross section.

51. A tube support grid array for providing lateral support for tubes within a steam generator, comprising:
    a plurality of first elongate strips having a cross section including at least one protuberant portion, each of said first elongate strips including a plurality of first and second slots arranged in alternating fashion along a bottom portion thereof, said first elongate strips extending in a first direction in said support grid array;
    a plurality of second elongate strips having a cross section including at least one protuberant portion, each of said second elongate strips including a plurality of third and forth slots arranged in alternating fashion along a top and bottom portion thereof, respectively, each of said third slots being interlocked with one of said first slots, whereby each of said second elongate strips extend in a second direction, different from the first direction, in said support grid array;
    a plurality of third elongate strips having a cross section including at least one protuberant portion, each of said third elongate strips including a plurality of fifth and sixth slots arranged in alternating fashion along a top portion thereof, each of said fifth slots being interlocked with one of said second slots, whereby each of said third elongate strips extend in the second direction, parallel to said second elongate strips;
    a plurality of fourth elongate strips having a cross section including at least one protuberant portion, each of said fourth elongate strips including a plurality of seventh and eighth slots arranged in alternating fashion along a top and bottom portion thereof, respectively, each of said seventh slots being interlocked with one of said fourth slots and each of said eighth slots being interlocked with one of said sixth slots, whereby each of said forth elongate strips extend in the first direction, parallel to said first elongate strip; and
    a plurality of spaced apart holes extending through each of said first, second, third and forth elongate strips.

52. A tube support grid array for providing lateral support for tubes within a steam generator according to claim 51, wherein the at least one protuberant portion of each of said first, second, third and fourth elongate strips is positioned along the bottom portion of each of said strips such that each of said strips has a substantially T-shaped cross section.

53. A tube support grid array for providing lateral support for tubes within a steam generator according to either of claims 51 or 52, wherein each of said first, second, third, fourth, fifth, sixth, seventh, and eighth slots includes an open end and a closed end, said closed end having a width greater than a width of said open end.

54. A tube support grid array for providing lateral support for tubes within a steam generator according to either of claims 51 or 52, wherein each of said first, second, third, fourth, fifth, sixth, seventh, and eighth slots includes an open end and a closed end, and wherein a portion intermediate said open end and said closed end has a width greater than a width of both said open end and said closed end.

55. A support grid for tubes within a steam generator, comprising:

a plurality of interlocking first elongate strips having a cross section including a first protuberant portion, said first protuberant portion being positioned such that said first elongate strips have a substantially T-shaped cross section;

a plurality of second elongate strips interlocked with said first elongate strips, said plurality of second elongate strips each having a cross section including a second protuberant portion, said second protuberant portion being positioned such that said second elongate strips have a substantially T-shaped cross section; and a plurality of slots arranged along a length of said first elongate strips, each of said first slots including an open portion and a closed portion, said open portion having a width dimensioned so as to receive either said first or said second protuberant portions therein.

56. A support structure for tubes within a steam generator according to claim 55, further comprising:

a plurality of holes extending through each of said first elongate strips, said holes being positioned between each of said plurality of slots.

57. A support structure for tubes within a steam generator according to claim 56, further comprising:

a plurality of spaced apart holes extending through each of said second elongate strips.

\* \* \* \* \*